Feb. 24, 1970     J. M. VALDESPINO     3,497,064
AEROBIC WASTE SYSTEM WITH PNEUMATIC EJECTION AND CHLORINATION
Filed April 17, 1969     2 Sheets-Sheet 1

United States Patent Office 3,497,064
Patented Feb. 24, 1970

3,497,064
AEROBIC WASTE SYSTEM WITH PNEUMATIC EJECTION AND CHLORINATION
Joe M. Valdespino, Orlando, Fla., assignor to Water Pollution Controls, Inc., a corporation of Delaware
Filed Apr. 17, 1969, Ser. No. 817,102
Int. Cl. C02c 1/30, 1/10; B01d 21/02
U.S. Cl. 210—117                                    11 Claims

ABSTRACT OF THE DISCLOSURE

An aerobic waste treatment system of the type that introduces air through a venturi directly into a solid waste material, aerates in a vacuum tank, and preaerates in combination with hydraulic comminution; includes a pneumatic ejection and chlorine feed system to chlorinate waste material in measured batches and also forcibly eject the chlorinated waste material by pneumatic pressure without utilizing corrodable moving parts. A settling tank in the system is surrounded by the hydraulic comminutor and has a filtering screen to filter the outflow and a skimmer operated by venturi vacuum to skim the settling tank.

BACKGROUND OF THE INVENTION

Field of the invention

This invention relates to improvements in aerobic waste treatment systems and particularly to chlorination and forcible discharge from such systems.

Prior art

It is known in the prior art to aerobically treat waste material following a hydraulic comminution and preaeration step, see U.S. Patent 3,311,239 granted Mar. 28, 1967. If the waste material is to be discharged by gravity, it merely flows over a weir in a settling tank. However, many such systems are useful on ships and are positioned below the water line so it is necessary to forcibly eject the effluent. In other places where the system would be useful it is also desirable to provide forcible ejection of the effluent. The use of pumps with moving parts for forcible ejection causes problems due to the corrosion of the pump parts and the requirement common to such systems of only part-time or batch discharge.

It is also desirable in waste treatment systems to chlorinate the effluent to kill the bacteria in it. The use of chlorine further complicates the corrosion problems mentioned above, and measuring the correct amount of chlorine to add is a further complication, especially when there is intermittent discharge.

For a ship board installation of a waste treatment system listing of the ship must be accommodated. Furthermore, floating grease should be skimmed from the top of the settling tank and floating solids prevented from passing from the settling tank into the discharged effluent.

SUMMARY OF THE INVENTION

An aerobic waste treatment system, e.g. of the type shown in U.S. Patent 3,311,239 granted Mar. 28, 1967, includes a pneumatic ejection batch discharge of the effluent and pneumatic feed of a measured amount of chlorination, both automatically operated in response to liquid level in an ejection tank. Other improvements in the art include a filter screen and skimmer in the settling tank and the use of a single pump for both preaeration-hydraulic comminution and vacuum aeration.

DESCRIPTION OF THE PREFERRED EMBODIMENTS

Figure 1:
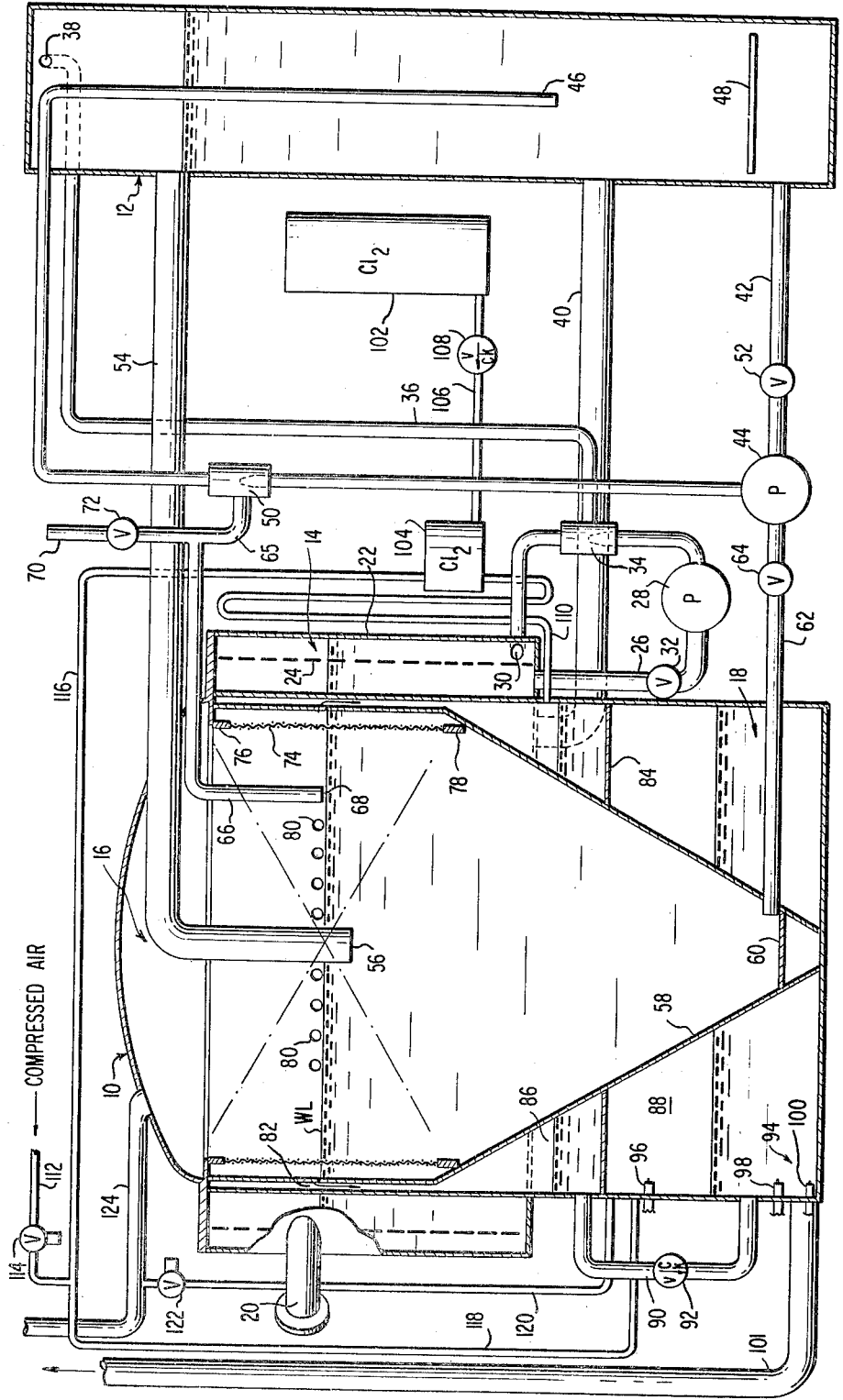
FIG. 1 is a side elevational view, partially schematic, illustrating the system of this invention.

Referring to FIG. 1, the aerobic waste treatment system of this invention includes a primary tank assembly 10 and a vacuum aeration tank 12. The primary tank assembly is composed of a preaeration-hydraulic comminution tank 14, a settling tank 16, and an ejection tank 18.

An incoming conduit 20 is provided for feeding liquid and solid waste material into the preaeration-hydraulic comminution tank 14. This tank has a cylindrical outer wall 22 and a cylindrical expanded metal grinding screen 24 spaced between the outer and inner wall. Hydraulic comminution and preaeration are accomplished by recirculating the incoming liquids and solids in a recirculating loop line 26, the force for recirculation being provided by pump 28 and the recirculated liquids and solids re-entering the comminution tank through tangential inlet 30 which directs the liquids and solids against the outside of the cylindrical expanded metal grinding screen 24 to reduce the solid materials to fine solids in a manner similar to that described in Patent 3,311,239. The recirculating loop is controlled by valve 32 and the recirculated material is aerated with a preaeration venturi aspirator 34 which draws air in through air line 36 having its outer end 38 in the vacuum aeration tank 12 to draw the vacuum therein.

A conduit 40 connects the preaeration-hydraulic comminution tank 14 to the vacuum aeration tank 12 so that materials in tank 14 after a certain amount of comminution and preaeration may be discharged through line 40 into vacuum aeration tank 12. Vacuum aeration tank 12 also has a recirculation loop or line 42 which includes a pump 44 and a return line 46 discharging the recirculated materials toward a baffle 48 near the bottom of the tank 12. The recirculation line includes an aeration venturi aspirator 50 for accomplishing the aeration and valve 52 controls the recirculation loop.

Aeration tank 12 is under vacuum which is pulled by preaeration venturi aspirator 34 and this vaccum aids in the aeration of the materials in tank 12. A line 54 extends from near the top of tank 12 into the settling tank 16 with an outlet 56 of conduit 54 being below a waterline WL in the settling tank so as to accommodate listing of the ship up to the maximum list angle as illustrated by the dot and dash lines in FIG. 1 by virtue of the outlet 56 being a sufficient distance below the water level at the center of the tank.

Settling tank 16 is part of the primary tank assembly and includes conical lower side walls 58 and a bottom wall 60 for accumulating the settled solids which have been aerated. A conduit 62 is provided for recirculation of the solids via pump 44 and under control of valve 64 through the venturi aspirator 50 and back into the vacuum aeration tank 12 through outlet 46. The aeration of these solids gets the oxygen to the solid materials much better and more efficiently than aeration of liquids with solids therein.

An air line 65 providing the air drawn into venturi aspirator 50 has a branch 66 extending into the settling tank 12 with outlet 68 positioned just above the water level WL to function as a vacuum skimmer and to skim off the floating grease and solids from the settling tank and put them back through the system. The air line 65 includes a vent to atmosphere 70 controlled by a valve 72 which therefore also functions to control the skimming action.

Within the settling tank 16 there is positioned a fine filter screen 74 extending around the periphery of the tank above and below the water level and positioned inwardly of the side walls of the tank by supports 76 and 78.

At the water line WL within the settling tank 16 there are a number of orifice outlets 80 which are behind the annular screen 74. Therefore, the screen screens out any solid materials which might otherwise pass through the orifice outlets 80 into the ejection tank 18.

Between the outer wall of the settling tank 16 and the inner wall of the hydraulic comminution preaeration tank 14 is an annular passageway 82 through which the discharged effluent may flow into the ejection tank 18. The ejection tank 18 is divided into two compartments by a horizontal dividing plate 84. An upper compartment 86 is a chlorine receiving compartment while a lower compartment 88 is an effluent discharge compartment. The compartments are in fluid communication via conduit 90 controlled by a one way valve 92 which permits flow only from the upper compartment 86 to the lower compartment 88, and checks flow in the reverse direction.

The effluent discharge compartment 88 has a liquid level sensor system 94 including an upper level electrode 96, a lower level electrode 98 and a common electrode 100 for the purpose of sensing the liquid level in the compartment 88 and controlling the chlorine feed and pneumatic ejection accordingly.

The system includes a chlorine solution tank 102 and a chlorine receiver receptacle 104 of measured volume to provide the correct amount of chlorine for a discharged batch volume of effluent. The chlorine solution tank and chlorine receiver receptacle are connected by tubing 106 which has a check valve 108 allowing flow only from the chlorine solution tank to the chlorine receiver receptacle. Another length of tubing 110 connects the chlorine receiver 104 to the chlorine receiving compartment 86 and includes an upper loop to prevent siphoning.

A compressed air inlet 112 receives compressed air from any suitable source such as a compressed air storage tank and feeds the compressed air into the system for controlling chlorination and pneumatic ejection under control of a normally closed solenoid valve 114. The compressed air line branches after solenoid valve 114 into a chlorine feed air line 116 connected to the chlorine receiver receptacle 104 and a pneumatic ejection air line 118 connected directly into discharge compartment 88. The discharge compartment 88 is also provided with a vent tubing connection 120 which is controlled by a normally open solenoid valve 122 to discharge into a vent stack 124 of the settling tank.

The operation of the system shown in FIG. 1 will now be described. A substantial portion of the operation especially in the preliminary stages of hydraulic comminution-preaeration, vacuum aeration, and settling is similar to that described in U.S. Patent 3,311,239. The incoming waste material, liquids and solids are discharged from line 20 into the hydraulic comminution-preaeration tank 14. This waste material is comminuted and aerated by being recirculated through recirculation line 26 by means of pump 28 with aeration provided by venturi aspirator 34 and hydraulic comminution by the forcible discharge of the recirculated liquids and solids against the outer periphery of cylindrical grinding screen 24.

The comminuted liquid and solids waste materials are discharged from tank 14 into vacuum aeration tank 12 by flow through line 40. The liquids in tank 12 are aerated and the tank is held under vacuum due to the action of venturi aspirator 34, the aeration being accomplished by recirculation through line 42 via pump 44 through venturi aspirator 50 and the recirculted solids are directed toward baffle 48. Flow from the vacuum aeration tank into the settling tank is via line 54 with its outlet 56 being beneath the water level WL at the center of the tank to be sure that the discharge is always under the water level even when a ship lists. The solids settling in settling tank 60 will be aerated and recirculated via line 62, pump 44 and venturi aspirator 50 into vacuum aeration tank 12. Skimming of floating material from the settling tank is accomplished by skimming tube 66 having an outlet at the water level 68 and being operated by the venturi aspirator 50. The liquid effluent from the settling tank is filtered by filtering screen 74 before passing through the orifices 80 into chlorine receiving compartment 86 of the ejection tank 18.

During the pneumatic ejection cycle when normally closed solenoid valve 114 is opened, air under pressure passes through chlorine feed line 116 into the top of chlorine receiver receptacle 104 and forces chlorine out of this receptacle through line 110 into the chlorine receiver compartment 86. The amount of chlorine fed will be equal to the amount of chlorine in receiver receptacle 104 plus a negligible amount of chlorine in the tubing. This amount of chlorine solution is pre-calculated to provide adequate chlorination for the volume discharged during batch ejection.

At the same time the normally closed solenoid valve 114 opens, compressed air passes through line 118 forcing the liquid in discharge tank 88 to seek a way to escape. Check valve 92 prevents the liquid from passing upwardly into compartment 86 so the liquid passes out through effluent discharge line 101.

The chlorine feed and effluent discharge cycle is started when the liquid level in compartment 88 rises to the level of the top electrode 96. This causes opening of normally closed solenoid 114 and closing of normally open vent solenoid 122. The vent being closed, the compressed air ejecting the liquid causes the liquid to flow out discharge line 101 until the lower level liquid sensor 98 is uncovered at which time the position of the solenoid valves 114 and 122 return to their normal position, the solenoid vent valve 122 being normally open and the compressed air solenoid valves 114 being normally closed so that the system can again start filling the discharge compartment 88 as required.

Figure 2:
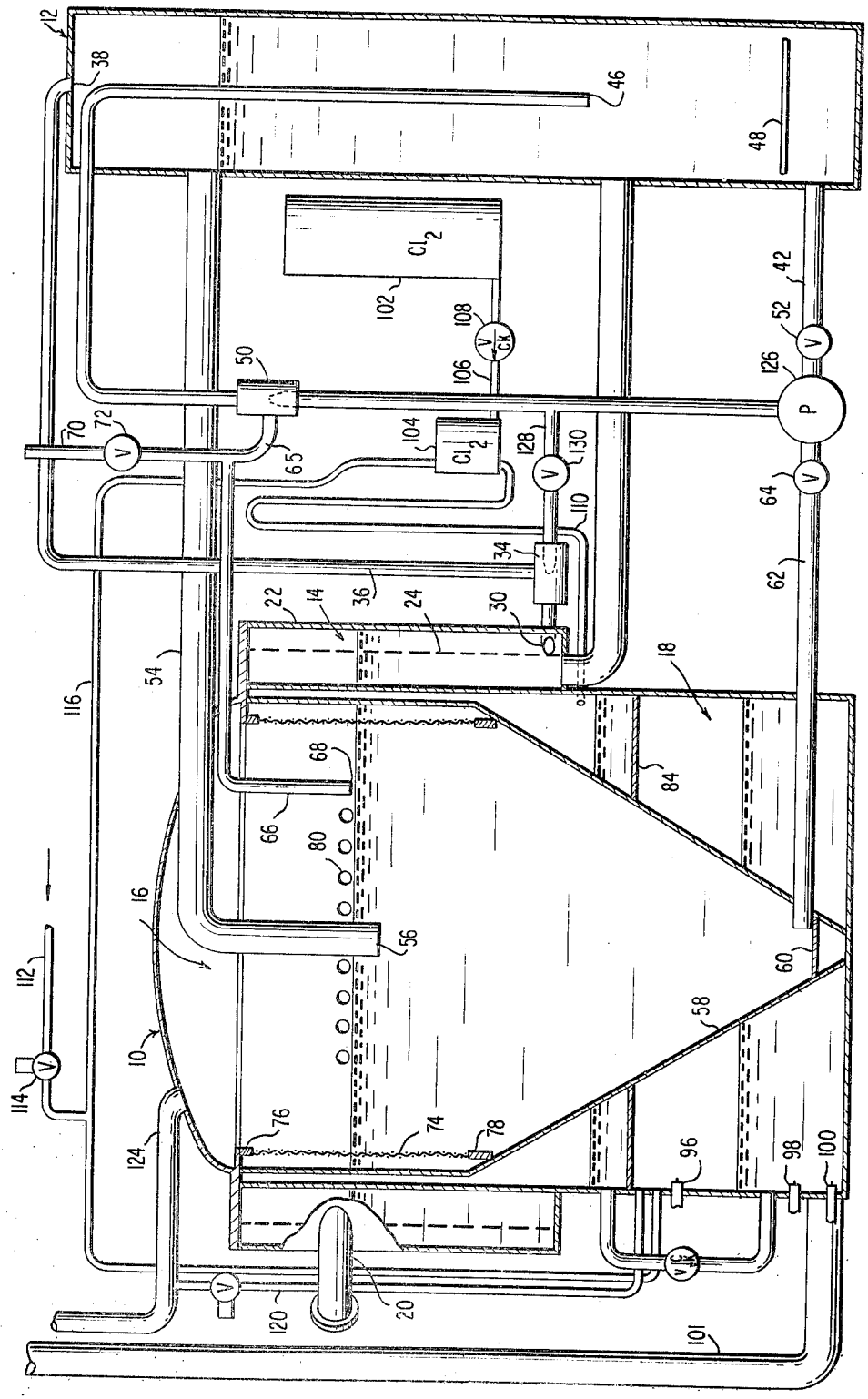
FIG. 2 is a view similar to FIG. 1 illustrating a modification utilizing a single pump.

FIG. 2 shows another embodiment of the invention wherein many of the components are identical with that of FIG. 1 and like reference numbers have been applied where the components are identical. FIG. 2 differs from FIG. 1 in that only a single pump 126 is used for the recirculation hydraulic comminution preaeration and for the vacuum aeration skimming. As shown in FIG. 2 pump 126 discharges into venturi aspirator 50 and through a branch line 128 controlled by valve 130 into the preaeration venturi 34. The recirculation for hydraulic comminution is not directly out of the preaeration tank 40 but is thus out of the vacuum aeration and settling tanks. The operation of the system of FIG. 2 is identical to that of FIG. 1 with the exception that the single pump 126 pumps the liquids through both venturi aspirators 34 and 50.

As can be seen, a unique system for batch chlorination and effluent ejection utilizing pneumatic force automatically controlled solves many problems of corrosion, ejection and chlorination in a small and compact waste treatment system.

I claim:

1. An aerobic waste treatment system of the type including an aeration tank for aerating waste material, a settling tank in communication with the aeration tank for settling aerated waste material, force discharge means for discharging effluent, and chlorination means for chlorinating the discharged effluent, the improvements comprising: an injection tank connected to receive liquid effluent discharge from the settling tank, liquid level sensing means in the ejection tank, a receiver receptacle tank of predetermined volume connected to selectively receive a chlorine solution from a chlorine solution tank and to selectively discharge the predetermined volume of chlorine solution into the ejection tank, a source of gas under pressure controllably connected to the chlorine receptacle and to the ejection tank to cause discharge of chlorine from the chlorine receptacle into the ejection tank and to cause discharge of chlorine effluent from the ejection tank under control of the liquid level sensing means.

2. An aerobic waste treatment system as in claim 1 wherein the ejection tank is divided into two compartments, a chlorine receiving compartment and an effluent discharge compartment, the chlorine receiver receptacle discharges into the chlorine receiving compartment, and the source of gas under pressure is in communication with the effluent discharge compartment and the chlorine receiver receptacle.

3. An aerobic waste treatment system as in claim 2 wherein the compartments of the ejection tank are in communication through a one way check value allowing flow from the chlorine receiving compartment to the effluent discharge compartment.

4. An aerobic waste treatment system as in claim 3 wherein the effluent discharge compartment discharges into an upwardly extending discharge pipe, and further comprising means under control of liquid level sensors for venting the effluent discharge compartment.

5. An aerobic waste treatment system as in claim 4 wherein the settling tank discharges into the chlorine receiving compartment of the ejection tank through a filtering screen in the settling tank.

6. An aerobic waste treatment system as in claim 5 wherein the chlorine receiving compartment of the ejection tank surrounds a portion of the settling tank, and the settling tank is in communication with the chlorine receiving compartment of the ejection tank through a series of orifices in the wall of the settling tank behind the filtering screen.

7. An aerobic waste treatment system as in claim 6 wherein the aeration tank is in communication with the settling tank via a conduit which extends vertically into the settling tank at the center thereof and to a point below the liquid level to transfer aerated liquids and solids from the aeration tank to the settling tank and prevent uncovering of the end of the conduit on listing of a ship mounting the system.

8. An aerobic waste treatment system of the type including a preaeration hydraulic comminuting tank for receiving incoming waste material, a first venturi aspirator for preaeration of recirculated liquids from the preaeration-hydraulic comminution tank, a vacuum aeration tank connected to receive preaerated comminuted waste material, a second venturi aspirator for aeration of recirculated waste materials outside the vacuum aeration tank, a settling tank connected to receive vacuum aerated waste materials from the vacuum aeration tank, a connection for recirculating solids from the bottom of the settling tank through the venturi aspirator outside the vacuum aeration tank, a conduit connecting an air aspirating connection of the first venturi aspirator to the vacuum aeration tank to draw a vacuum therein, with the improvement comprising: a single pump connected to recirculate liquids through both venturi aspirators for venturi preaeration of the recirculated waste material fed into the hydraulic comminutor, for aeration of recirculated waste material externally of the vacuum aeration tank, and for aeration of recirculated solids from the bottom of the settling tank.

9. An aerobic waste treatment system as in claim 8 wherein the second venturi aspirator has an air aspirating connection to a surface skimmer of the settling tank.

10. An aerobic waste treatment system as in claim 9 wherein the preaeration-hydraulic comminuting tank is an annular tank mounted around the periphery of the settling tank.

11. An aerobic waste treatment system as in claim 8 further comprising: automatic pneumatic ejection and chlorination means including a chlorine solution receiver tank, a source of compressed air, and liquid level sensors to control the compressed air and in turn provide selective batch discharge of the chlorine solution receiver tank to chlorinate effluent from the settling tank and of the effluent from the settling tank.

References Cited

UNITED STATES PATENTS

| | | | |
|---|---|---|---|
| 481,606 | 8/1892 | Wasson | 210—117 |
| 1,067,786 | 7/1913 | Miller | 210—105 |
| 1,083,740 | 1/1914 | Hodges | 210—120 |
| 3,311,239 | 3/1967 | Valdespino | 210—195 |
| 3,338,826 | 8/1967 | Kramer | 210—120 |

JAMES L. DECESARE, Primary Examiner

U.S. Cl. X.R.

210—120, 152, 195, 220, 256